No. 775,924. Patented November 29, 1904.

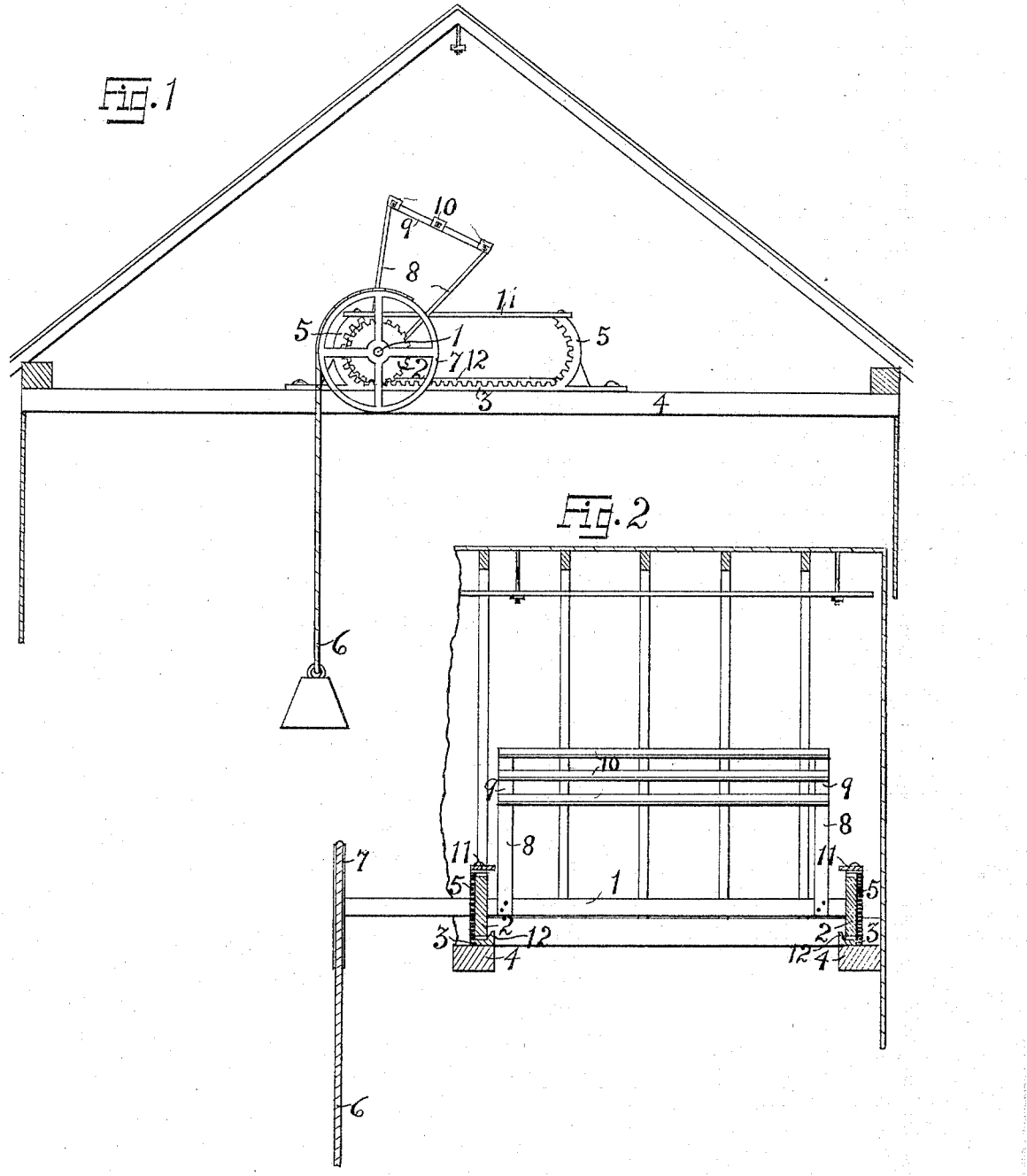

UNITED STATES PATENT OFFICE.

OTIS HYATT AND GEORGE HYATT, OF FRIENDSVILLE, OHIO.

HAY-DISTRIBUTER.

SPECIFICATION forming part of Letters Patent No. 775,924, dated November 29, 1904.

Application filed August 17, 1904. Serial No. 221,026. (No model.)

*To all whom it may concern:*

Be it known that we, OTIS HYATT and GEORGE HYATT, citizens of the United States, residing at Friendsville, in the county of Medina and State of Ohio, have invented certain new and useful Improvements in Hay-Distributers, of which the following is a specification.

Our invention relates to improvements in hay-distributers designed to be used in barns or in other places in connection with hay-carriers for automatically distributing the hay; and the paramount object of the invention is to produce a generally improved device of this class which will be exceedingly simple in construction, cheap of manufacture, and efficient in use and which when used in conjunction with any ordinary hay fork or carrier which draws the hay up into the peak of the inclosure is adapted to automatically distribute the same laterally upon either side when released, thus saving the labor of handling it after it is drawn up into the mow or other inclosure where it is desired to be stored.

With these ends in view the invention consists in the novel construction, arrangement, and combination of parts hereinafter described, illustrated in the accompanying drawings, and particularly pointed out in the appended claims.

Referring to the drawings forming a part of this specification, Figure 1 is a side elevation of this invention in its operative position when applied to the frame of a barn. Fig. 2 is a side elevation of the same, partly in section, in order that some of the parts may be more clearly understood.

In the drawings, 1 designates the main revoluble beams of the distributer, provided at or near each end with cog-wheels 2, adapted to travel upon the racks 3, mounted upon the cross-beams 4 of the barn. The racks 3 are provided at each side with upturned ends 5, which serve as stops for the cog-wheels 2 when the distributer has been returned to its normal position by means of the cord and weight 6, attached to the operating-wheel 7, secured to the end of the main revoluble beam 1 adjacent to the barn-floor in which the load of hay is being unloaded.

To the main revoluble beam 1 there is secured, near each end thereof, two supporting-beams 8, to which are secured the cross-beams 9, and these two cross-beams 9 are connected by three rack arms or bars 10, which in the normal position of the spreader are adapted to catch the hay as it falls from the hay fork or carrier above, and it will be seen that as soon as the hay falls upon the rack arms or bars 10 the weight of the same will cause the distributer to be revolved to the right, overturning the bunch of hay and throwing it to the right of the center of the mow. It will also be observed that as the distributer is turned the cog-wheels 2 will have advanced on the racks 3 toward the centers thereof.

When left free from the hay, the distributer will be caused to return to its normal position, as shown, by means of the weight and cord 6.

11 designates two bars or covers secured in any suitable and convenient manner to the upturned ends 5 to prevent any hay from falling on the cog-wheels 2 and into the racks 3.

12 designates a flange secured to the inner side of the racks 3 and designed to prevent the cog-wheels 2 of the distributer from being pulled or pushed off from the said racks 3.

When it is desired to deposit the hay upon the opposite side of the mow, the distributer is revolved over to the other side of the racks 3 and the weight and cord 6 are placed upon the opposite side of the operating-wheel 7, and the hay will then be deposited upon the left or opposite side of the mow. The distributer catches the hay as it is released from the hay fork or carrier above, and as it is revolved not only moves the same laterally toward the side of the mow, but entirely overturns the same as it falls to the mow below. Should the pitch of the roof or the general construction of the barn be such as not to permit of the racks 3 being mounted directly on top of the cross-beams 4, as shown in the drawings, and leave room above the distributer for the drawing in of the hay, the racks 3 may be suspended directly beneath the same and attached thereto in any suitable and convenient manner.

Having thus explained the nature of our invention, and described a way of constructing and using the same, although without having attempted to set forth all the forms in which it may be made or all the modes of its use, I declare that what I claim, and desire to secure by Letters Patent, is—

1. A hay-distributer, consisting of a revoluble beam, provided with supporting-beams and rack arms or bars, cog-wheels mounted on said revoluble beam, racks mounted beneath said cog-wheels and secured to the cross-beams of the barn, an operating-wheel mounted on the end of said revoluble beam, and a cord and weight connected to said operating-wheel whereby said revoluble beam is returned to its normal position when the same has been revolved.

2. A hay-distributer for barns, consisting of a revoluble beam, supporting-beams secured to said revoluble beam, cross-beams secured to the outer ends of said supporting-beams, rack arms or bars mounted on said supporting-beams, cog-wheels mounted on said revoluble beam, racks mounted beneath said cog-wheels and secured to the cross-beams of the barn, upturned ends or stops formed with the ends of said racks, an operating-wheel mounted on the end of said revoluble beam, and a cord and weight connected to said operating-wheel whereby said revoluble beam is returned to its normal position when the same has been revolved.

3. In a hay-distributer, the combination with a revoluble beam, provided with supporting-beams and rack arms or bars, and cog-wheels mounted near the ends thereof; of racks suitably mounted beneath said cog-wheels, upturned ends or stops formed with said racks, an operating-wheel mounted on the end of said revoluble beam, and a cord and weight connected to said operating-wheel whereby the hay-distributer is revolved on said racks and is normally held in its proper operative position against said stops formed with said racks.

In testimony whereof we have affixed our signatures in presence of two witnesses.

OTIS HYATT.
GEORGE HYATT.

Witnesses:
OBED C. BILLMAN,
H. E. MANTZ.